Figure 1:
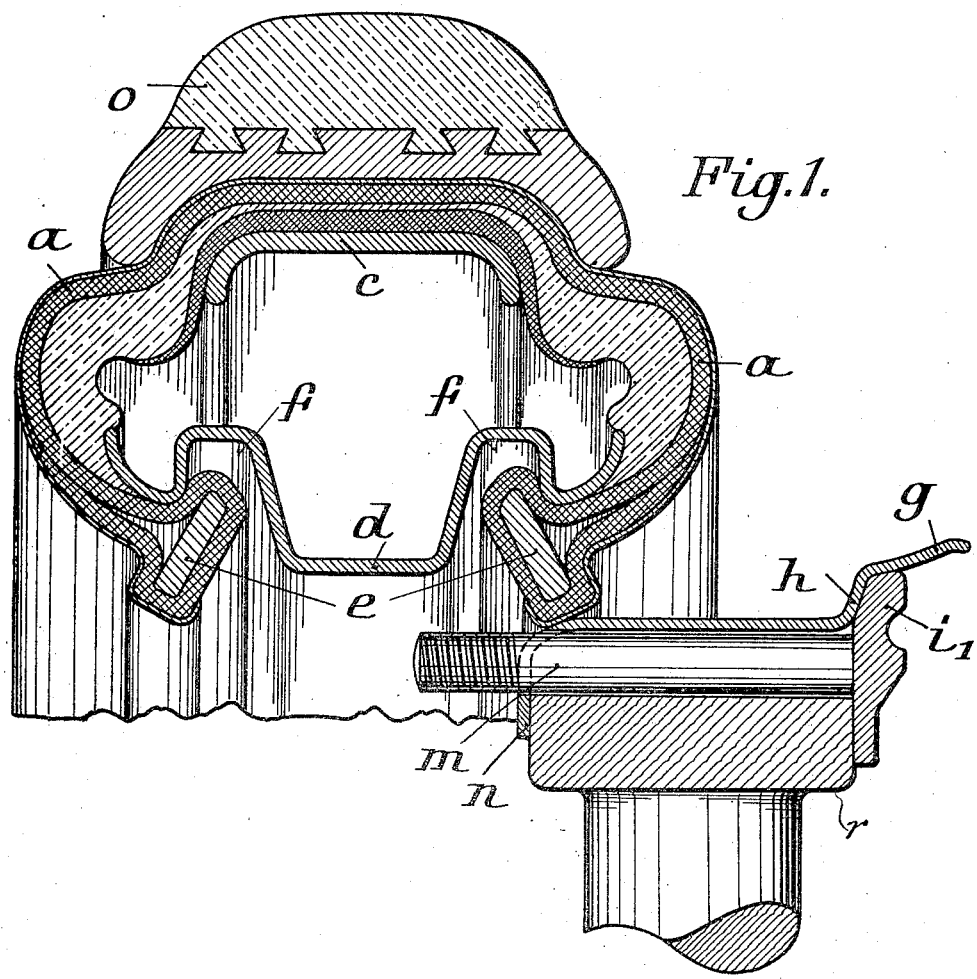

T. L. CARBONE.
RESILIENT TIRE.
APPLICATION FILED JAN. 11, 1911.

1,189,788.

Patented July 4, 1916.
5 SHEETS—SHEET 1.

WITNESSES
John Murtagh
L. J. Murphy

INVENTOR
Tito Livio Carbone
by Goepel & Goepel
his attorneys

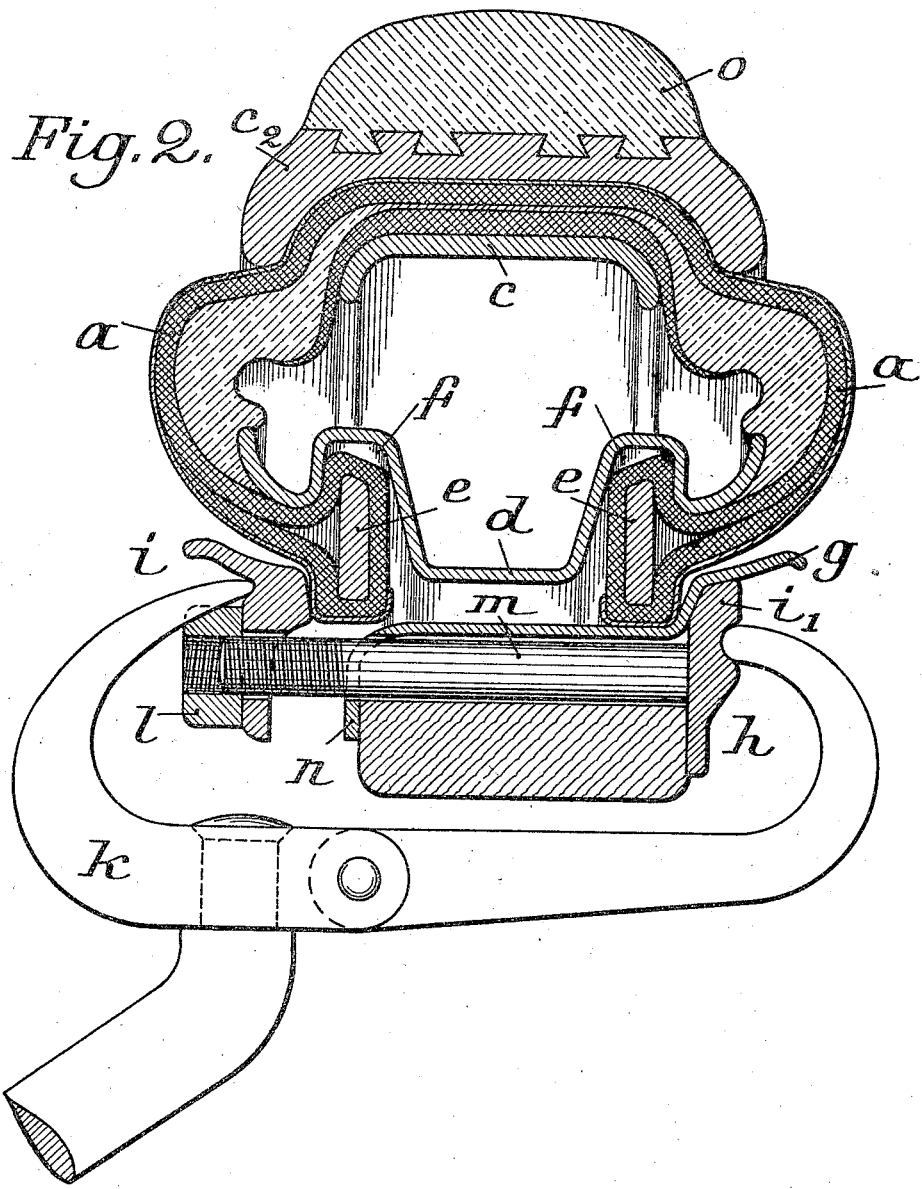

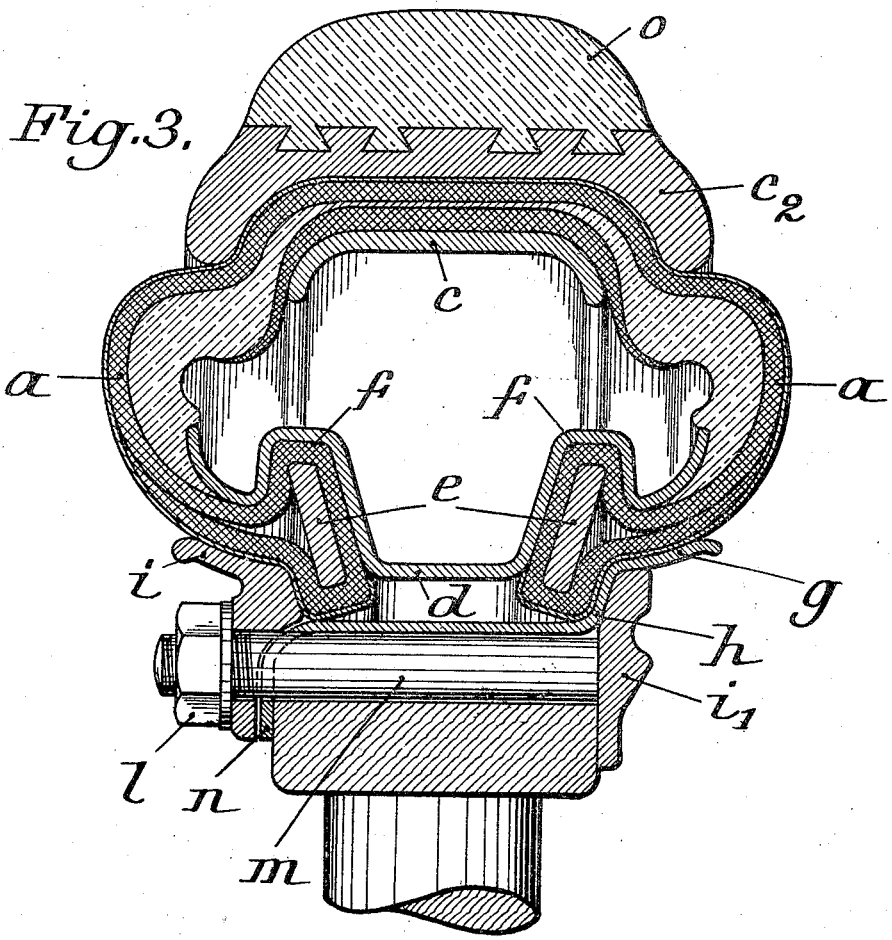

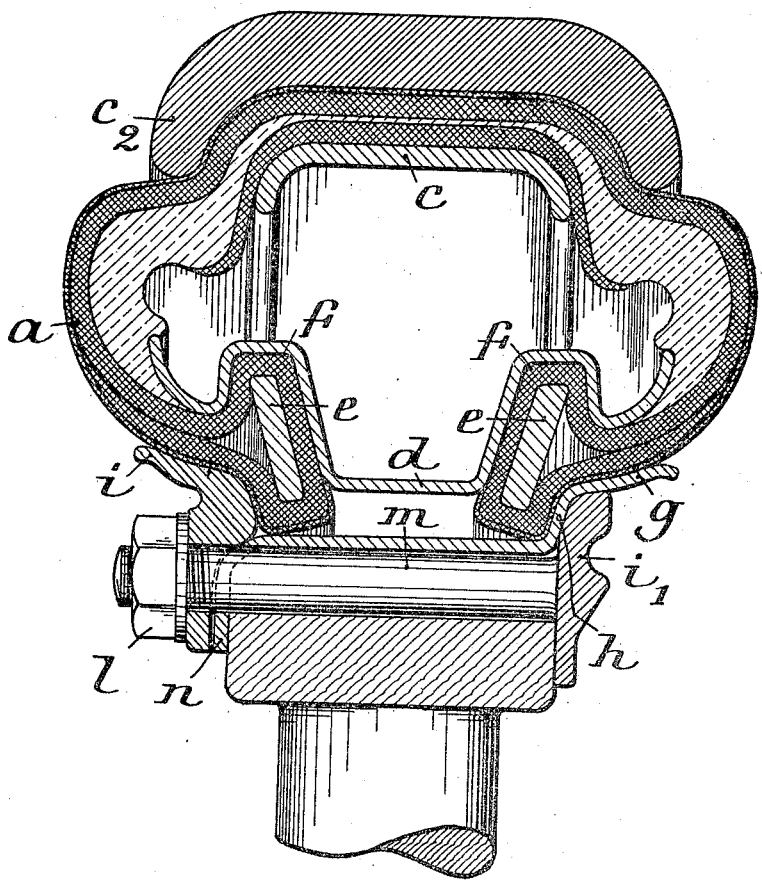

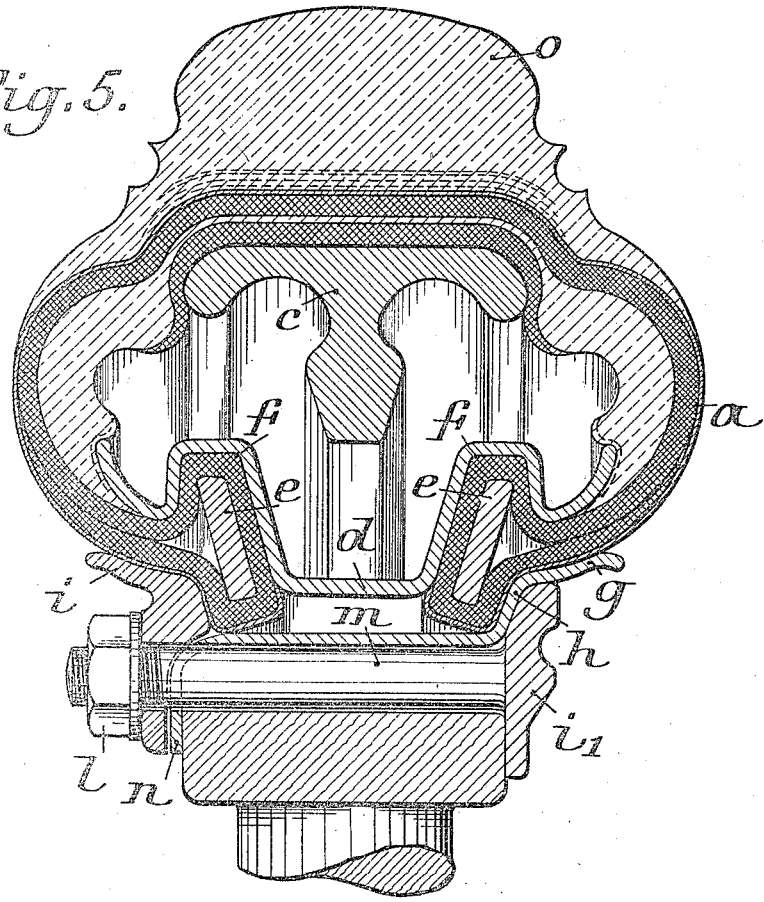

UNITED STATES PATENT OFFICE.

TITO LIVIO CARBONE, OF CHARLOTTENBURG, GERMANY.

RESILIENT TIRE.

1,189,788.  Specification of Letters Patent.  Patented July 4, 1916.

Original application filed February 12, 1910, Serial No. 543,525. Divided and this application filed January 11, 1911. Serial No. 601,982.

*To all whom it may concern:*

Be it known that I, TITO LIVIO CARBONE, a citizen of the Confederation of Switzerland, residing in Charlottenburg, near Berlin, in the Empire of Germany, have invented certain new and useful Improvements in Resilient Tires, of which the following is a specification, this application being a division of my application No. 543,525, filed February 12, 1910.

This invention relates to a resilient tire of that kind in which the rim of the wheel and the tire are so constructed that the tire can be replaced on the road without any special apparatus or tools, and for this purpose, the invention consists of the combination, with the rim of a wheel, of a fixed flange on one side of the rim, a detachable flange on the other side, a cover provided with beads at the inner edges, and means for securing said detachable flange into operative position.

The invention consists further of certain details of construction, which are fully described hereinafter and finally pointed out in the claims.

In the accompanying drawings, Figs. 1 and 2 represent vertical transverse sections of my improved tire, shown in the act of being placed on the rim: Fig. 3 is a vertical transverse section showing the tire in position on the rim; Fig. 4 is a similar section of the tire shown in operative position on the rim and provided with a rigid tread, and Fig. 5 is also a similar section, provided with a resilient outer tread.

Similar letters of reference indicate the same parts in the different figures in the drawings.

Referring to the drawings, $a$ represents the cover, which is extended around an inner stretching ring $d$, pressed out of sheet steel or similar material and an outer stretching ring $c$. The felly $r$, which may be made of wood or other material, is covered with a ring $h$, which is preferably pressed out of sheet steel and prevented from moving laterally on the felly by a downwardly-bent flange $n$ at one side, and an upwardly-extending annular flange $g$ at the opposite side of the felly. A ring-shaped flange $i'$ is arranged at one side of the felly and held thereon by bolts $m$, which pass through and which are located in transverse recesses of the felly. The cover $a$ is clamped between an outer rigid band $c^2$, having a rubber tread $o$, or the like, and the rigid stretching ring $c$, the whole forming one entire structure with the band $c^2$. The cover $a$ is open at its inner edges and provided with beads $e$ of the well known shape, which are inserted into correspondingly-shaped grooves $f$ of the inner stretching ring $d$. The cover $a$ together with the stretching ring $d$, is forced from the open side, that is, from the left-hand side in Figs. 1 and 2, over the felly $r$ until the right-hand bead comes into contact with the flange $i'$, as shown in Fig. 2. The left hand bead of the cover $a$ is then pulled down and brought into its proper position against a flange or ring $i$ which is pushed over the projecting ends of the bolts $m$, so that by means of a pair of tongs $k$, it is forced inwardly over the rim to a sufficient extent to enable nuts $l$ to be screwed over the projecting threaded ends of the bolts $m$ by tightening the nuts on to the detachable flange $i$. It is then completely tightened against the felly until the parts assume the position shown in Fig. 3. In this manner not only the beads of the cover $a$ are securely held in position between felly $r$ and the inner stretching ring $d$, but the cover is uniformly stretched while being applied to the rim. This construction of the tire enables the cover to have an outer rigid ring $c^2$, such as are ordinarily provided for heavy vehicles, without having to make the tread band of several pieces. To that end the stretching ring $c$ is made into the shape of a divided ring and provided with a spreading device of any well known construction. It can then be introduced into the cover before fixing the tire on the rim and combined so as to form one rigid whole with the outer tread-band by spreading. As the tire is not subjected to variable pressure but has to be brought to a definite size, it can be made in such a manner that it can be radially cut so that the ends of the sections thus produced can be made to overlap so as to reduce its diameter to such an extent that it can be introduced into the cover after the latter has been placed into the tread-band $c^2$ and spread afterward until the free ends meet. It will then be as rigid against forces acting radially from the outside as if it were made in one piece.

The outer tread-band can be either faced with a soft rubber-layer $o$, as shown in Figs. 1, 2 and 3, or it can be used without a rubber layer, as shown in Fig. 4.

Having thus described my invention, I claim as new and desire to secure by Letters Patent:

1. The combination of a ring-shaped flange, a detachable ring-shaped flange, said flanges having broad bearing surfaces, bolts extending from the first-mentioned ring-shaped flange to the said detachable ring-shaped flange, a detachable ring-shaped plate extending from and over the fixed flange, and to and under the detachable flange, and a cover having beads with bearing surfaces coöperating with said bearing surfaces of said rings, held by said ring-shaped plate and said flanges.

2. In a resilient tire, the combination of a cover having enlarged beads disposed substantially perpendicularly thereto, an inner stretching ring having substantially vertically disposed depressed seats formed therein for holding the beads of said cover, and means for holding the beads within said seats.

3. In a resilient tire, the combination of an inner stretching ring having a depressed portion and substantially vertically disposed depressed seats formed therein at either side of said depressed portion, a cover having beads held in said seats, said beads being separated by said depressed portion, and means for holding said beads within said seats.

4. In a resilient tire, the combination of an inner stretching ring having depressions with substantially parallel sides forming seats and lateral parts extended outwardly from said seats, a cover provided with enlarged beads held in the said seats and having the narrower portions of said cover adjacent to said enlarged beads pressed against the said lateral parts extending outwardly from said seats, pressing means for pressing against the beads of the cover for holding the same within the said seats of the inner stretching ring, said pressing means being adjacent said narrower portions of said cover and on those sides thereof opposite to said seats of said inner stretching ring, and operating to press said beads into said depressed seats of said stretching ring.

In testimony, that I claim the foregoing as my invention, I have signed my name in presence of two subscribing witnesses.

TITO LIVIO CARBONE.

Witnesses:
 HENRY HASPER,
 WOLDEMAR HAUPT.